United States Patent
Yagishita et al.

(10) Patent No.: US 7,486,411 B2
(45) Date of Patent: Feb. 3, 2009

(54) IMAGE PROCESSING DEVICE FORMING AN IMAGE OF STORED IMAGE DATA TOGETHER WITH ADDITIONAL INFORMATION ACCORDING TO AN IMAGE FORMATION COUNT

(75) Inventors: Takahiro Yagishita, Kanagawa (JP); Yukiko Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1191 days.

(21) Appl. No.: 10/230,090

(22) Filed: Aug. 29, 2002

(65) Prior Publication Data
US 2003/0048923 A1   Mar. 13, 2003

(30) Foreign Application Priority Data
Sep. 12, 2001   (JP) ............................. 2001-276576

(51) Int. Cl.
G06F 15/00 (2006.01)
G03B 7/00 (2006.01)

(52) U.S. Cl. ...................... 358/1.15; 348/362

(58) Field of Classification Search ................ 358/1.15, 358/403, 407, 1.14, 1.16, 434; 348/222.1, 348/362, 461, 468, 243; 705/1, 27, 51, 57, 705/76; 707/4, 201
See application file for complete search history.

(56) References Cited

U.S. PATENT DOCUMENTS

| | | | |
|---|---|---|---|
| 4,875,063 A | 10/1989 | Idenawa et al. | |
| 4,918,489 A | 4/1990 | Inage et al. | |
| 4,977,414 A | 12/1990 | Shimada et al. | |
| 5,019,913 A | 5/1991 | Kiya et al. | |
| 5,107,278 A | 4/1992 | Shimada et al. | |
| 5,384,646 A * | 1/1995 | Godshalk et al. | 358/448 |
| 5,452,099 A * | 9/1995 | Von Meister | 358/403 |
| 5,491,506 A | 2/1996 | Yagishita et al. | |
| 5,565,907 A | 10/1996 | Wada et al. | |
| 5,666,211 A * | 9/1997 | Tahara et al. | 358/404 |
| 5,923,828 A | 7/1999 | Yagishita | |
| 5,930,466 A * | 7/1999 | Rademacher | 358/1.15 |
| 6,459,816 B2 | 10/2002 | Matsuura et al. | |
| 6,480,823 B1 | 11/2002 | Zhao et al. | |
| 6,538,677 B1 * | 3/2003 | Thompson et al. | 347/131 |
| 2005/0253934 A1 * | 11/2005 | Yamagishi et al. | 348/222.1 |

OTHER PUBLICATIONS

U.S. Appl. No. 10/230,090, filed Aug. 29, 2002, Yagishita et al.
U.S. Appl. No. 10/797,066, filed Mar. 11, 2004, Yamazaki et al.
U.S. Appl. No. 10/617,193, filed Jul. 11, 2003, Yamazaki et al.

(Continued)

*Primary Examiner*—Saeid Ebrahimi Dehkordy
(74) *Attorney, Agent, or Firm*—Oblon, Spivak, McClelland, Maier & Neustadt, P.C.

(57) ABSTRACT

When this image processing device forms an image on a sheet, an image data storage unit stores image data received by an image data reception unit. An image formation count unit counts the number of times the image of the stored image data is formed by an image output unit. An information addition unit adds additional information to the image data according to the counted number of times. The image output unit forms the image of the image data together with the additional information on the sheet.

8 Claims, 3 Drawing Sheets

OTHER PUBLICATIONS

U.S. Appl. No. 09/945,840, filed Sep. 5, 2001, unknown.
U.S. Appl. No. 09/085,714, filed May 28, 1998, allowed.
U.S. Appl. No. 09/330,007, filed Jun. 11, 1999, pending.
U.S. Appl. No. 09/401,503, filed Sep. 22, 1999, allowed.
U.S. Appl. No. 09/455,923, filed Dec. 7, 1999, allowed.
U.S. Appl. No. 09/565,545, filed May 5, 2000, pending.
U.S. Appl. No. 09/664,832, filed Sep. 19, 2000, pending.
U.S. Appl. No. 10/153,654, filed May 24, 2002, pending.
U.S. Appl. No. 10/230,090, filed Aug. 29, 2002, pending.

* cited by examiner

FIRST OUTPUT

SECOND OUTPUT

THIRD OUTPUT

FIFTH OUTPUT

IMAGE PROCESSING DEVICE FORMING AN IMAGE OF STORED IMAGE DATA TOGETHER WITH ADDITIONAL INFORMATION ACCORDING TO AN IMAGE FORMATION COUNT

BACKGROUND OF THE INVENTION

1. Field of the Invention

The present invention generally relates to an image processing device, and more particularly, to an image processing device having a security function in a printing apparatus, such as a printer, a copying machine, or a facsimile, or in an input apparatus, such as a scanner, which stores obtained image data in the apparatus itself.

2. Description of the Related Art

Recently, recording media, such as a DRAM (Dynamic Random Access Memory) and a HDD (Hard Disk Drive) have become less costly; accordingly, it has become possible to store a large quantity of image data in an image processing device at a low cost. Thus, a storing (filing) function can be added to an apparatus which conventionally has only a function of printing on a sheet, or printing image data read from a subject document. Since an apparatus having the storing function is capable of storing image data that have been processed before, the apparatus can perform a reprocessing (i.e., outputting a same image data again) in a largely shortened operation time.

Whereas such apparatuses have become more convenient as above, there has occurred a security problem. Specifically, there has occurred a risk that a third person may illegally output the stored image data. Conventionally, a personal identification using a password has been introduced in an attempt to prevent such an illegal output.

By the way, though not aimed at preventing an illegal output of stored image, Japanese Laid-Open Patent Application No. 6-268791 describes a digital copying apparatus that can perform a normal copying process, and at the same time, can display image data on a monitor, for the purpose of tracking an illegal use of the apparatus. Additionally, Japanese Laid-Open Patent Application No. 7-212602 describes a copying apparatus having a security function which attempts to prevent an illegal use by converting image data into image data suitable for a reductive printing, and storing the image data. Thus, monitoring stored image data, or applying a predetermined process to image data upon storing the image data, is intended to enable a conjecture of the presence of an illegal use, or a conjecture of an illegal user.

However, regarding the above-mentioned conventional apparatuses, once the password for the personal identification is broken, it becomes difficult to conjecture whether or not there has been an illegal output, or who has output image data illegally. In addition, the digital copying apparatus and the copying apparatus having the security function described in Japanese Laid-Open Patent Application No. 6-268791 and Japanese Laid-Open Patent Application No. 7-212602, respectively, are aimed at preventing an illegal deed concerning a first output upon storing image data, and thus cannot deal with an illegal output of already stored image data (a second output onward). Further, those copying apparatuses are not contrived to facilitate a reprocessing using the stored image data.

SUMMARY OF THE INVENTION

It is a general object of the present invention to provide an improved and useful image processing device in which the above-mentioned problems are eliminated.

A more specific object of the present invention is to provide an image processing device which facilitates a conjecture of whether or not there has been an illegal output, or who has output image data illegally, and also facilitates a reprocessing of stored image data.

In order to achieve the above-mentioned objects, there is provided according to one aspect of the present invention an image processing device comprising an image data reception unit receiving image data, an image data storage unit storing the image data received by the image data reception unit, an image output unit forming an image of the image data on a sheet, the image data being stored in the image data storage unit, an image formation count unit counting an image formation count of the image data when the image output unit forms the image of the image data, and an information addition unit adding additional information to the image data according to the image formation count counted by the image formation count unit, the image of the image data to be formed by the image output unit, wherein the information addition unit adds the additional information to the image data when the image formation count of the image data is equal to or larger than two so that the image output unit forms the image of the image data together with the additional information on the sheet.

According to the present invention, upon reprocessing the stored image data, information, such as a date and an hour at which the reprocessing is performed, can be synthesized with the image data so as to be superimposed thereon. Adding this information facilitates the conjecture of who illegally output the images.

Additionally, in the image processing device according to the present invention, the information addition unit may add the additional information to the image data also when the image formation count of the image data is equal to one.

According to the present invention, adding this information upon the first output (formation) of the image data facilitates the conjecture of who illegally output the images, especially in cases where the output image is not easily put under a management of a proper owner of the output image.

Additionally, the image processing device according to the present invention may further comprise a selection unit selecting the additional information added by the information addition unit according to the image formation count counted by the image formation count unit.

According to the present invention, the form of the additional information can be varied upon the first output and upon the second output. For example, the additional information is superimposed on the image data so that the additional information becomes inconspicuous upon the first output. Accordingly, the additional information becomes less obstructive for the proper owner to view the output image.

Additionally, in the image processing device according to the present invention, the additional information added to the image data by the information addition unit may be information of a plurality of types including a date and an hour concerning the image data.

According to the present invention, upon the first output, a minimum amount of the additional information can be selected for the superimposition synthesis with the image data. Accordingly, the additional information becomes less obstructive for the proper owner to view the output image.

Additionally, in the image processing device according to the present invention, the additional information added to the image data by the information addition unit may include the image formation count of the image data counted by the image formation count unit.

According to the present invention, the cumulative count (the image formation count) of outputting stored image data can be synthesized with the image data so as to be superimposed thereon. Adding this information facilitates a confirmation of whether or not there has been an illegal output.

In order to achieve the above-mentioned objects, there is also provided according to another aspect of the present invention an image processing device comprising an image data reception unit receiving image data, an image data storage unit storing the image data received by the image data reception unit, an image output unit forming an image of the image data on a sheet, the image data being stored in the image data storage unit, and an information addition unit adding additional information including a date and an hour to the image data, the image of the image data to be formed by the image output unit, wherein the image output unit forms the image of the image data together with the additional information on the sheet.

According to the present invention, information, such as an input date and hour, can be synthesized with the image data so as to be superimposed thereon. This information superimposed on the image data proves that the image data existed at the date and the hour.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of an embodiment according to the present invention.

Figure 1:
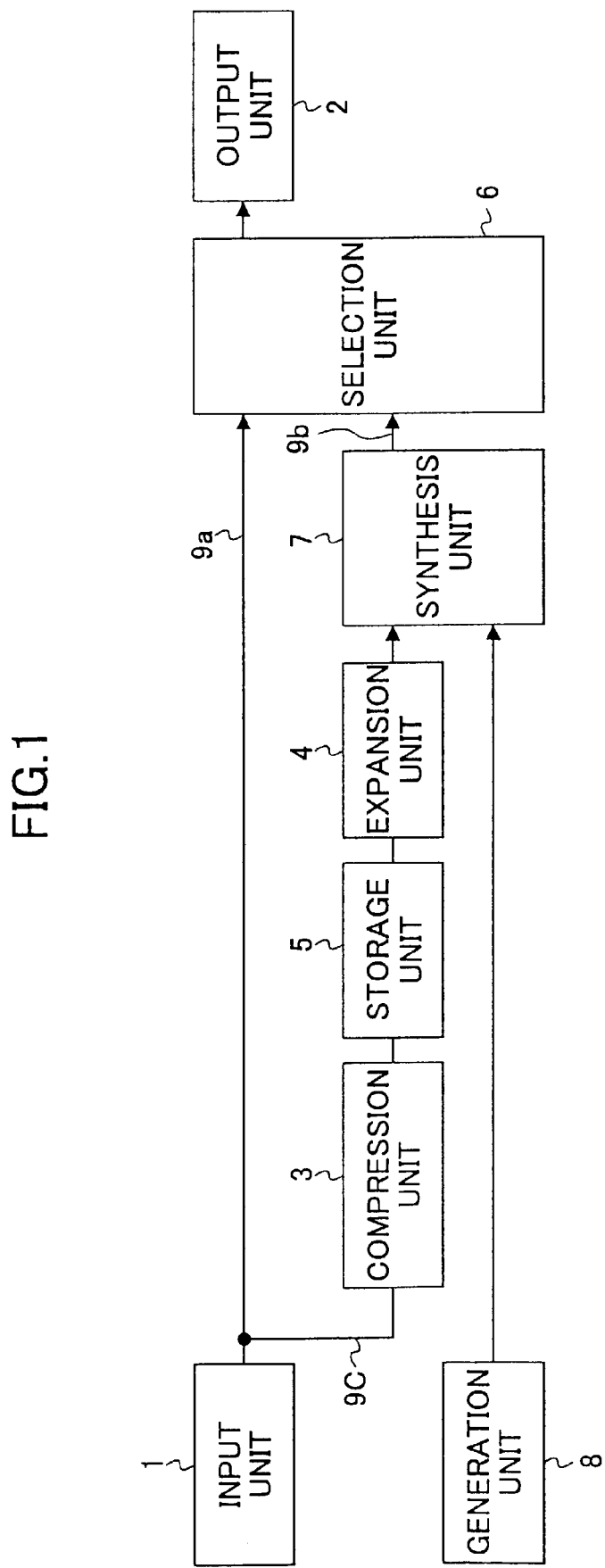
FIG. 1 is a block diagram of an image processing device according to an embodiment of the present invention.

FIG. 1 is a block diagram of an image processing device according to the present embodiment.

An input unit (an image data reception unit) 1 is a part generating bitmap electronic data of an image. For example, the input unit 1 reads a subject document by means of a scanner, etc., takes a photograph by means of a digital camera, develops a bitmap from a page description language by means of a printer control, and decodes a received code by means of a facsimile.

An output unit (an image output unit) 2 is a part visualizing electronic data of an image, or transferring the electronic data of the image externally from the image processing device. For example, the output unit 2 prints by means of electrophotography or inkjet, displays by means of a monitor, and transmits to a network or a facsimile line.

A compression unit 3 and an expansion unit 4 compresses/expands image data by using a method, such as JPEG (Joint Photographic Experts Group), JBIG, or MH/MR/MMR.

A storage unit (an image data storage unit) 5 is a RAM (Random Access Memory), a HDD, a magnetic tape, an MO, a CD, a DVD, etc.

A selection unit 6 is a part switching buses 9a and 9b according to conditions, and can be realized as a selector when realized as hardware.

A synthesis unit (an information addition unit) 7 is a part controlling phases of a plurality of image data inputs, and performing an operation of image data items so as to process the image data items into one synthesized data.

A generation unit 8 includes a timer generating information, such as a date and an hour, and a counter (an image formation count unit) storing cumulative output counts of stored image data, and is a part generating image data representing these information items.

Next, a description will be given of an operation of the image processing device according to the present embodiment. Besides, the image processing device according to the present embodiment is a device, such as a copying machine, a printer, a scanner, or a facsimile, having components such as shown in FIG. 1.

Upon a normal usage of the image processing device (upon a first output), the bus 9a is selected by the selection unit 6 so as to perform an image data output typical of an image processing device, and at the same time, the image data is transmitted to a bus 9c so that the image data is compressed by the compression unit 3, and thereafter is stored in the storage unit 5. Upon reprocessing (upon a second output and after), the image data stored in the storage unit 5 is expanded by the expansion unit 4 so that this expanded image data and the image data generated by the generation unit 8 are subjected to a superimposition synthesis by the synthesis unit 7. Then, the bus 9b is selected by the selection unit 6 so as to perform the reprocessing.

Besides, in the course of a normal usage where a plurality of output images of same image data are printed, a second output image and after are output according to a similar operation as the "first output". Specifically, although the image data stored in the storage unit 5 is used as in the second output and after, this image data is passed through the synthesis unit 7 without being subjected to the superimposition synthesis thereby, and is output via the bus 9b.

Using a large-capacity storage medium, such as a HDD, as the storage unit 5 enables storage of a large amount of images that have been processed by the image processing device. Using these stored images upon re-outputting a formerly processed image involves various advantages, such as a shorter processing time at the input unit 1, and a smaller amount of processing energy. In addition, these stored images can compensate for a change and a loss of original image data.

Next, a description will be given, with reference to FIG. 2A to FIG. 2D, of output results of the image processing device according to the present embodiment.

Figure 2A:
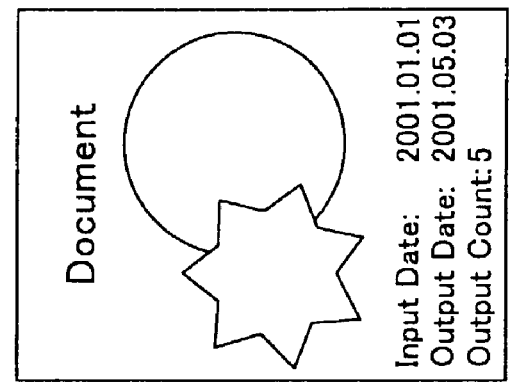
FIGS. 2A to FIG. 2D are illustrations of output results of the image processing device according to the present embodiment.

FIG. 2A shows a first output. Since an operation of the first output is performed under a management of a proper owner of an image thereof, the first output image can be prevented from flowing out to a third person; therefore, the image processing device does not add information, such as a date and an hour, to the first output image.

Figure 2B:
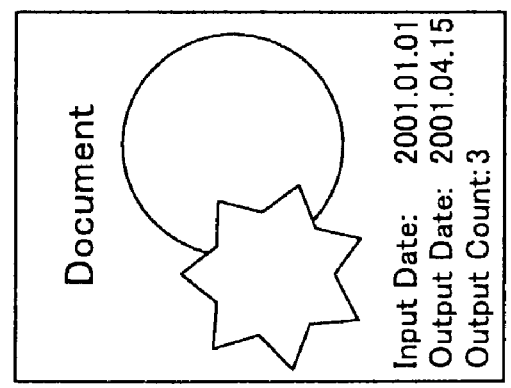
Figure 2C:
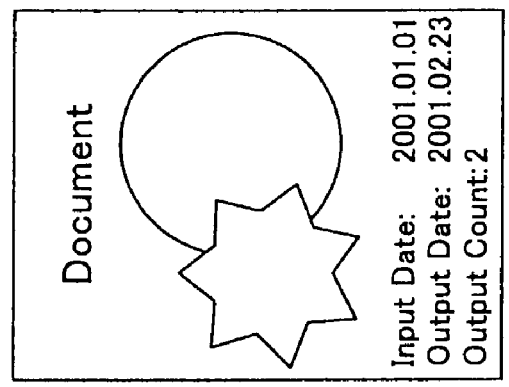
Figure 2D:
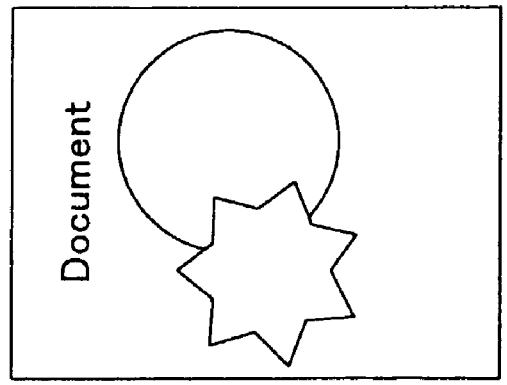

FIG. 2B shows a second output. FIG. 2C shows a third output. FIG. 2D shows a fifth output.

Since the second output and after are beyond the management of the proper owner, the second output and after are provided with measures for preventing the outflow of the images to a third person. In examples shown in FIG. 2B to FIG. 2D, information, such as a date and an hour, is overwritten on the images at lower parts thereof. Adding the output date and the hour to the images provides evidence for the date and the hour of an illegal output when the illegally output image is discovered; thereby, it can be conjectured from the date and the hour who operated the image processing device at the date and the hour.

Further, adding cumulative output counts by the generation unit 8 reveals an illegal output when there is an untraceable output image having a cumulative count lower than the latest cumulative count. For instance, when the output image shown in FIG. 2D is the latest (the fifth) output image, and only the second output image shown in FIG. 2B and the third output image shown in FIG. 2C are found, it is revealed that the fourth output image is illegally output.

Besides, even upon the first output, there are some cases where the image thereof is not easily put under the management of the proper owner. Those cases include a printing at a distant site, and a reception of facsimile matter. In these cases, it is preferred to add the above-mentioned information from the first output. Yet, since the first output image is often output by the proper owner, the additional information is so synthesized as to be inconspicuous. Methods for synthesizing the additional information inconspicuously include a synthesizing method for making the additional information not easily recognizable (e.g., printing with inconspicuous inks, an electronic watermark), and a synthesizing method for making the additional information seem less obstructive (e.g., figures like bar code, characters in micro size). Additionally, an amount of the additional information (such as input date information, output date information and output counts, as shown in FIG. 2A to FIG. 2D) to be synthesized may be changed by steps such that only the input date is added upon the first output, and the input date plus the output date and the output count are added upon the second output onward.

The image processing device structured as shown in FIG. 1 is aimed at facilitating the conjecture of who illegally output the images; furthermore, the same structure can prove that the image data existed at the date by adding the input date.

As a time stamp function of a common still-image camera or a moving-image monitor camera proves a three-dimensional condition at a specified date, a condition of a document and so forth can be proved in the same manner.

Figure 3:
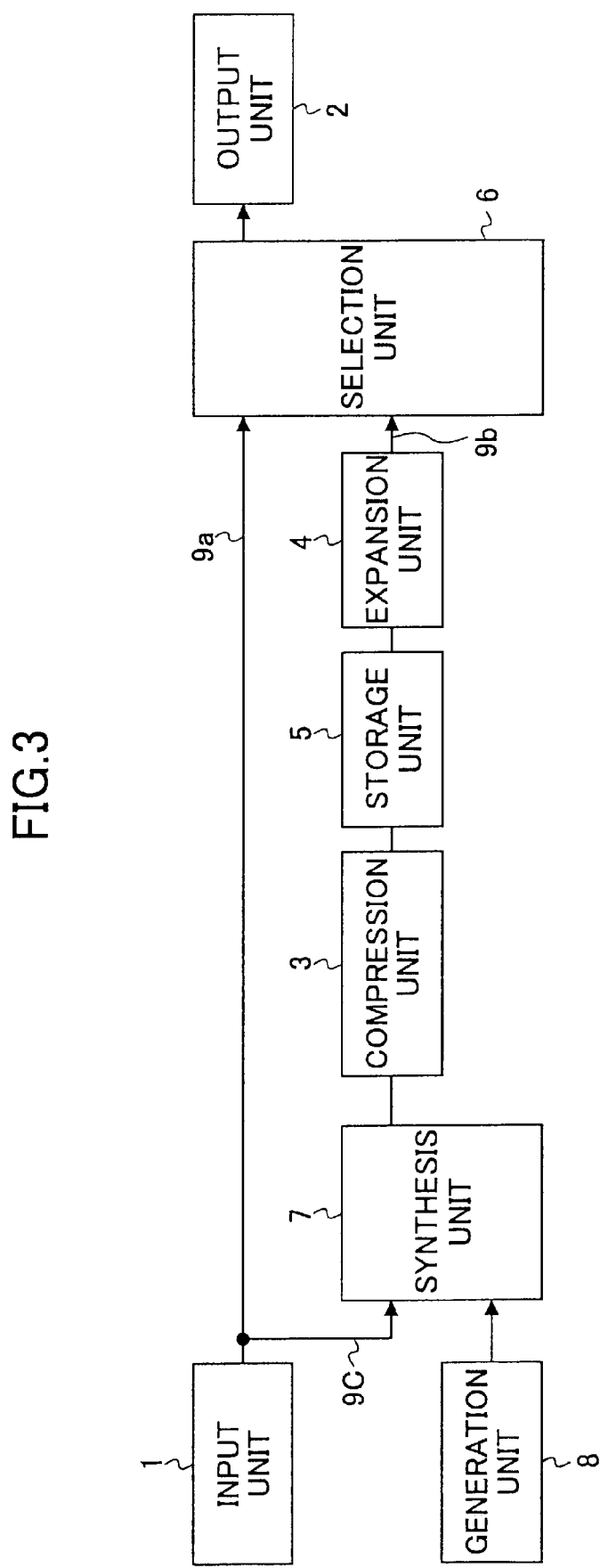
FIG. 3 is a block diagram of a variation of the image processing device according to the present embodiment.

For the purpose of adding the input date, the image processing device has a structure as shown in FIG. 3. Although the image processing device shown in FIG. 3 has the same components as shown in FIG. 1, the synthesis unit 7 is arranged at a different position so as to change the sequence of transmitting the image data.

The storage unit 5 stores images each of which is synthesized with an input date.

Additionally, the generation unit 8 may be provided with a function of storing an input date for each image data so that both the input date and the output date can be added as shown in FIG. 2A to FIG. 2D.

Besides, in the image processing device according to the present embodiment, the form of the additional information is not limited to the printing of the date information and so forth as shown in FIG. 2A to FIG. 2D; and various other forms, such as figures like bar code, printing with inconspicuous inks, an electronic watermark, and an addition outside a normal range for displaying are applicable.

As described above, in the image processing device according to the present embodiment, the additional information in the form of a bitmap is synthesized with original image data; thus, it is more difficult to alter image data than according to a method of adding the additional information in the form of a character code as a file header. Thereby, the image data can be protected.

In the image processing device according to the present embodiment, upon reprocessing stored image data, information, such as a date and an hour at which the reprocessing is performed, is synthesized with the image data so as to be superimposed thereon. This information facilitates the conjecture of who illegally output the images.

Additionally, in the image processing device according to the present embodiment, information, such as a date and an hour, is synthesized with image data so as to be superimposed thereon, also upon the first output. This information facilitates the conjecture of who illegally output the images, even in cases where the output image is not easily put under the management of the proper owner.

Additionally, in the image processing device according to the present embodiment, upon the first output, a minimum amount of the additional information is superimposed on image data so that the additional information becomes inconspicuous. Accordingly, the additional information becomes less obstructive for the proper owner to view the output image.

Additionally, in the image processing device according to the present embodiment, a cumulative count of outputting stored image data is synthesized with the image data so as to be superimposed thereon. This information facilitates a confirmation of the presence of an illegal output.

Additionally, in the image processing device according to the present embodiment, information, such as an input date and hour, is synthesized with the image data so as to be superimposed thereon. This information proves that the image data existed at the date and the hour.

The present invention is not limited to the specifically disclosed embodiments, and variations and modifications may be made without departing from the scope of the present invention.

The present application is based on Japanese priority application No. 2001-276576 filed on Sep. 12, 2001, the entire contents of which are hereby incorporated by reference.

What is claimed is:

1. An image processing apparatus comprising:
an image data inputting part inputting image data; a first storing part storing the image data input by said image data inputting part; a second storing part storing at least additional information including date/time information and a total number of times of image formation; a combining part combining the image data stored by said first storing part with the additional information stored by said second storing part in an overlapping manner only when the total number of times of image formation is greater than one; and an image forming part forming an image on a recording medium from the image data processed by said combining part, wherein said combining part modifies the additional information stored in the second storing part to be combined in the overlapping manner with the image data according to the total number of times of image formation, and wherein a sort of information from among the information stored by said second storing part, which said combining part combines with the image data, is made different according to the number of times of image formation.

2. The image processing apparatus as claimed in claim 1, further comprising: a compressing part compressing the image data stored by said first storing part; and a decompressing part decompressing the compressed data generated by said compressing part.

3. The image processing apparatus as claimed in claim 1, further comprising: a compressing part compressing the image data stored by the first storing part; and a decompressing part decompressing the compressed data provided by said compressing part.

4. The image processing apparatus as claimed in claim 1, further comprising:
   compressing the image data stored by said storing the image data; and
   decompressing the compressed image data provided by said compressing.

5. The image processing apparatus as claimed in claim 1, wherein the combining part further comprises combining the image data stored by said first storing part with only the date/time stored by said second storing part in an overlapping manner when the total number of times of image formation is equal to one.

6. The image processing apparatus as claimed in claim 1, wherein the date/time information of the additional information includes an input date of the image data as well as an output date corresponding to the date of formation of the image data.

7. An image processing method comprising:
   inputting image data; storing the image data input by said inputting; storing at least additional information including date/time information and a total number of times of image formation; combining the image data stored by said storing the image data with the additional information stored by said storing only when the total number of times of image formation is greater than one; and forming an image on a recording medium from the image data processed by said combining, wherein said combining modifies the additional information stored in the second storing part to be combined in the overlapping manner with the image data according to the total number of times of image formation, and wherein a sort of information from among the information stored by said storing date/time information, which said combining combines with the image data, is made different according to the number of times of image formation.

8. The image processing method as claimed in claim 7, further comprising:
   compressing the image data stored by said storing the image data; and
   decompressing the compressed image data generated by said compressing.

* * * * *